United States Patent [19]

Grillot et al.

[11] 4,339,961
[45] Jul. 20, 1982

[54] PRESSURE-RESPONSIVE APPARATUS FOR ASSEMBLING TRACK LINKS OR THE LIKE

[75] Inventors: John W. Grillot, Washington; Teddy R. Young, East Peoria, both of Ill.

[73] Assignee: Caterpillar Tractor Co., Peoria, Ill.

[21] Appl. No.: 129,924

[22] PCT Filed: Dec. 26, 1979

[86] PCT No.: PCT/US79/01130

§ 371 Date: Dec. 26, 1979

§ 102(e) Date: Dec. 26, 1979

[87] PCT Pub. No.: WO81/01806

PCT Pub. Date: Jul. 9, 1981

[51] Int. Cl.³ .................. F16H 21/44; B21L 9/00
[52] U.S. Cl. .................. 74/110; 59/7; 173/101
[58] Field of Search .......... 74/110; 59/7, 11; 72/442; 173/101

[56] References Cited

U.S. PATENT DOCUMENTS

| | | | |
|---|---|---|---|
| 1,946,911 | 2/1934 | Lindberg et al. | 59/7 |
| 2,757,391 | 8/1956 | Stottlemyer | 74/110 X |
| 3,028,723 | 4/1962 | Kaplan et al. | 59/7 |
| 3,075,346 | 1/1963 | Quarve et al. | 59/7 |
| 3,097,477 | 7/1963 | Rodgers | 59/7 |
| 3,939,648 | 2/1976 | Cullen | 59/11 |
| 4,027,471 | 6/1977 | Lipp et al. | 59/7 |

*Primary Examiner*—Allan D. Herrmann
*Attorney, Agent, or Firm*—Phillips, Moore, Weissenberger, Lempio & Majestic

[57] ABSTRACT

Conventional apparatus for assembling a track chain tend to impose undesirable bending moments and residual loads thereon. The apparatus (22) of this invention overcomes these problems by providing a pair of movable pressure heads (26,28) registering with first and second contact points (142,144) on opposite ends of a chain link (134) and a pressure equalizing plate (68) for sensing the resistance force at each contact point (142, 144) to direct an increased pressure to a selected one of the contact points (142,144) in response to the differential between the resistance forces at the contact points (142,144).

11 Claims, 4 Drawing Figures

PRESSURE-RESPONSIVE APPARATUS FOR ASSEMBLING TRACKS LINKS OR THE LIKE

DESCRIPTION

Technical Field

This invention relates to an apparatus for selectively applying pressure to a pair of contact points by movable pressure heads and more particularly to an apparatus for assembling an articulated track chain with the pressure heads.

Background Art

Conventional joints in track chains adapted for use in the track assemblies of track type vehicles include pin and bushing subassemblies having a sprocket engaging bushing and include a first pair of links pressed thereon, a pin rotatably disposed within the bushing, and a second adjacent pair of links pressed onto the opposite ends of the pin. A thrust ring generally positioned in a counterbore in one of the links spaces the assembled links at a preselected distance and cooperates with the counterbore in forming a chamber for receiving a lubricant retaining seal. Typically, track chains are assembled by multi-station track presses such as disclosed in U.S. Pat. No. 4,027,471 issued to Lipp et al, June 7, 1977 and assigned to the assignee of the present invention. The track presses include retractable rams and associated tooling fixtures for simultaneously pressing adjacent, overlapping link pairs onto adjacent pin and bushing subassemblies and indexing subsystems for sequentially moving the assembly a preselected distance from one station to the next.

The assembly of track chains has presented a number of problems including the difficulty of aligning and pressing the parts of a link to assemble them with each other and with previously assembled portions of the chain without introducing bending moments and high residual stresses in the chain or damage to the parts. Yet another problem introduced during assembly is that of controlling link end play to within acceptable limits. To obtain correct assembly, the link must contact or "bottom out" on the thrust ring in the chamber at one end being pressed onto a pin. At the other end, to obtain correct bushing protrusion, the tooling fixture must bottom out on the end of the bushing. One end always bottoms out first. Generally, the ratio of the force required to press a link onto a pin to the force required to press a link onto a bushing is approximately 2:1, if the dimensions of the respective members are nominal, but may vary from 1:1 to as high as 6:1, depending on dimensional variations. Thus, it may be seen that to bottom out the other end of the link for proper assembly, it may be necessary to apply press loads which are high enough to deflect or bend the tooling fixture. This, in turn, places intolerably high loads on the thrust ring which often is crushed in assembly. Additionally, the press fit relationship between the track chain elements prevents relaxation of these elements, thereby introducing high residual loads in the chain, which, in operation, cause thrust ring cracking and premature failure of the track.

Proper operation of the track requires that "link end play" must be controlled. Link end play is the amount of movement of a link along the longitudinal axis of the pin during operation of the track. It is an important parameter from the standpoints of wear and sealing effectiveness. A serious problem associated with excessive end play is the reduction of sealing effectiveness at the bushing-seal interface. Track joint seals are effective only over a limited gap range at the interface. If the gap is too great due to excessive end play, the resultant loss of lubricant will cause damage to the joint and a premature failure of the track chain and excessive vehicle down time.

On the other hand, if there is no end play of the outwardly disposed link ends, the joint during operation may be too tight, causing binding and excessive wear between the link faces, possible damage to the thrust ring, and, again, premature failure of the track chain. These problems are further aggravated by the thickness tolerances of the ends of the adjacent links and the dimensional tolerances of the pin and the bushing.

End play may be reduced by increasing the press forces employed during assembly of the links onto the pins and bushings. However, increased press forces lead to unacceptable loads being imposed onto the thrust ring thereby cracking or otherwise damaging the ring.

The assembly forces required may be reduced by tightening up the dimensional tolerances of the track chain components by precision machining the link ends, the pin, and the bushings. However, these alternatives entail additional operations and tooling and add to the cost of the track chain.

The foregoing illustrates limitations of the known prior art. In view thereof, it would be advantageous to provide a method and apparatus for assembling the components of a track chain without introducing bending moments and high residual loads in the previously assembled portions of the chain or damage in the components and with end play closely controlled within preselected limits.

DISCLOSURE OF THE INVENTION

In one aspect of the present invention, an apparatus for applying pressure to first and second contact points in response to a differential between a resistance force at each contact point comprises a housing including first and second laterally spaced and individually movable pressure heads for registry with the first and second contact points, respectively, means for pressurizing the pressure heads, and means for sensing the resistance force at each contact point for compensating for the differential between the resistance forces at each contact point and for directing an increased pressure to a preselected one of the contact points in response to the differential between the resistance forces at the contact points.

The apparatus of this invention is particularly adapted for assembling the component parts of a track chain without introducing bending moments and high residual loads into previously assembled portions of the chain to closely control end play in the chain.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
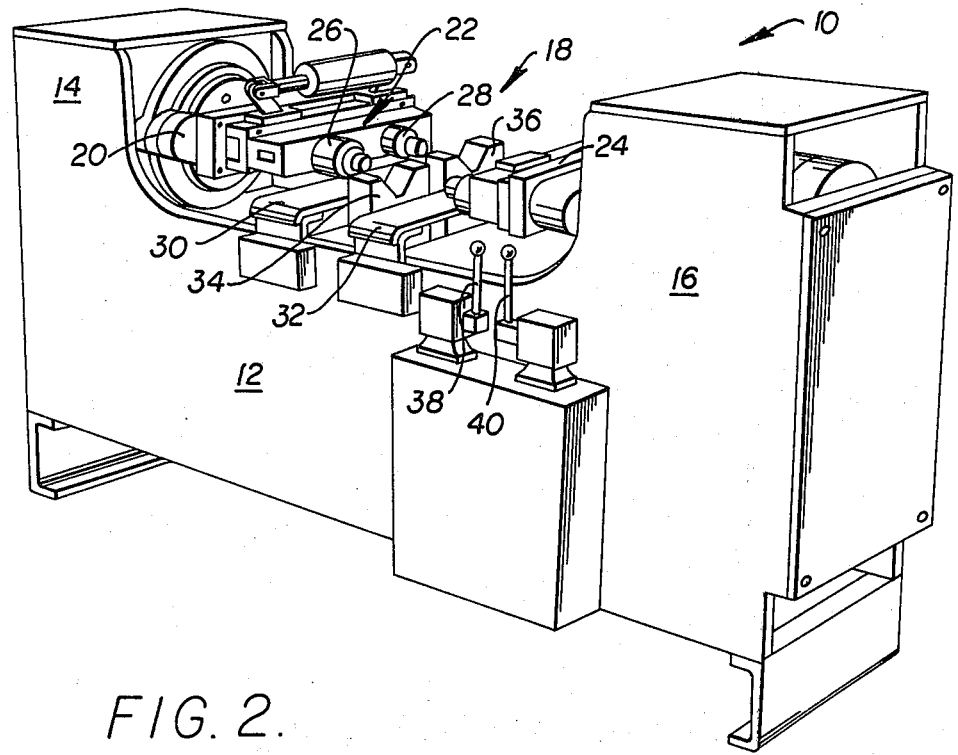
FIG. 1 is a perspective view of a multistation track press embodying the present invention.

Referring to FIG. 1, a track press embodying the present invention is illustrated generally by the numeral 10 and includes a horizontally extending bed or frame 12 and a pair of vertically extending supports 14,16 which, in combination, define a work station shown generally at 18. A ram 20 extends horizontally inwardly from the vertical support 14 and includes a multi-headed press fixture 22 releasably mounted thereto. An opposed ram 24 of the prior art construction extends horizontally inwardly from the vertical support 16. First and second reciprocating pressure heads 26,28 extend inwardly from the press fixture, the heads being laterally spaced apart a preselected distance in accordance with the joint spacing of the track chain being assembled. Means for supporting and positioning the unassembled links and the coacting, concentrically disposed pin and bushing subassemblies, in a predetermined relationship with one another adjacent the multi-headed press fixtures are secured to the bed at the work station and include, by way of example, elongated plates 30,32 and V-blocks 34,36. Suitable controls 38,40 are also provided for advancing and retracting the rams and for indexing the chain during the assembly process as is known in the art.

Figure 2:
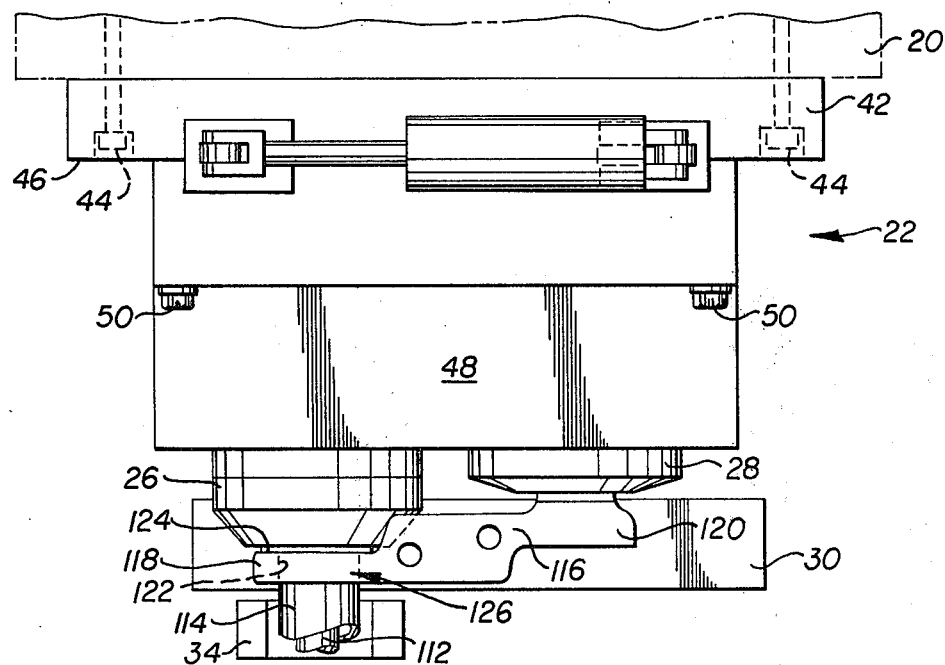
FIG. 2 is a top plan view of an embodiment of the present invention showing the initial step in the assembly of a chain.
Figure 3:
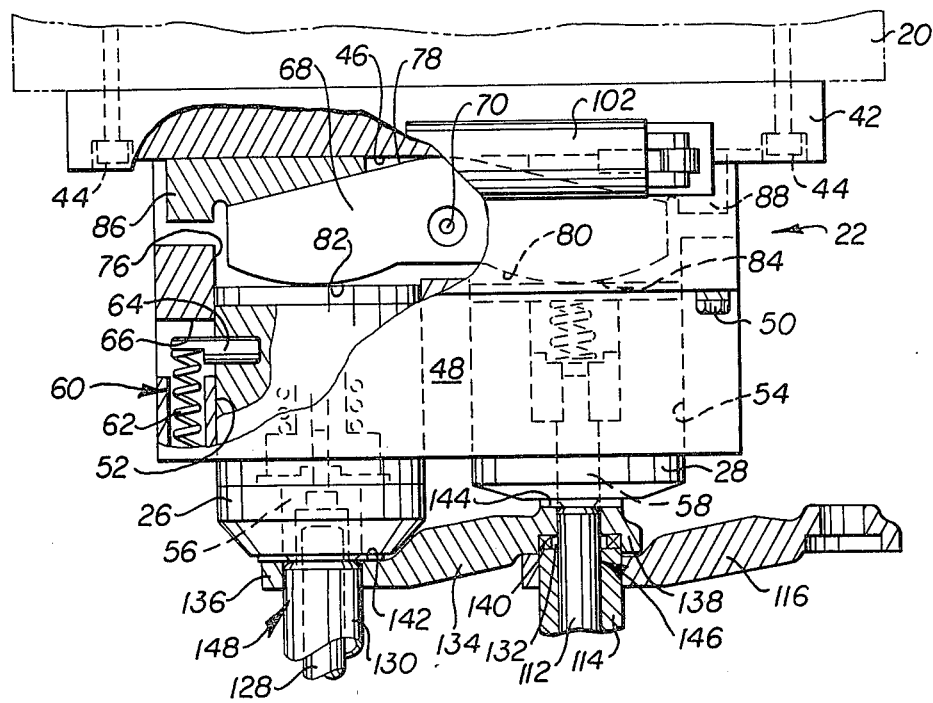
FIG. 3 is a top plan view of an embodiment of the present invention showing subsequent assembly steps and having portions removed to better illustrate the elements thereof.
Figure 4:
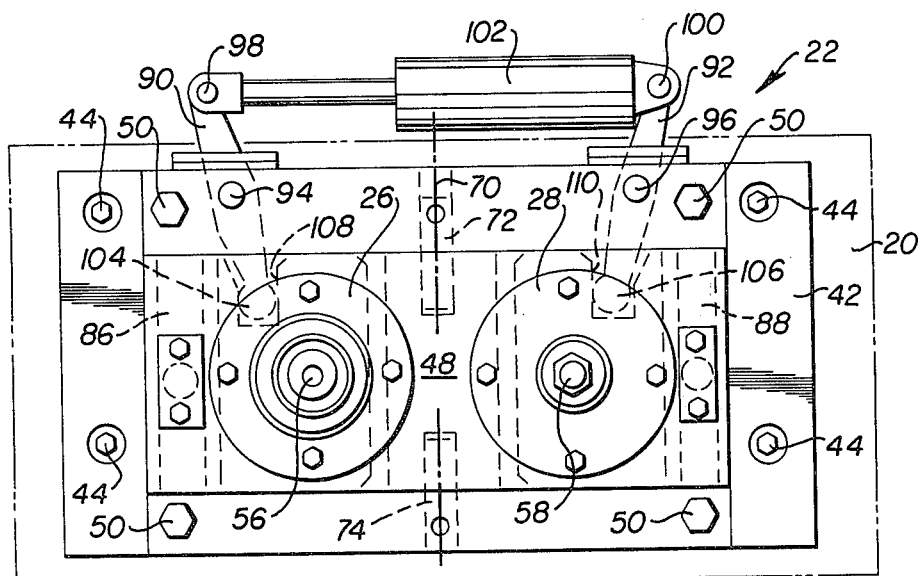
FIG. 4 is a front elevational view of the disclosed embodiment of the present invention.

Referring now to FIGS. 2, 3, and 4, the multiheaded press fixture 22 is shown in greater detail. The press fixture includes a pressure plate 42 secured to the ram 20 by suitable fastening means, for example bolts 44; the plate having a substantially flat, vertically extending exposed face 46.

A housing 48 is secured to the pressure plate 42 by bolts 50 and includes first and second apertures or bores 52,54 respectively having the first and second reciprocating pressure head 26,28, each head including a spring biased nose adaptor or pilot 56,58 disposed therein. Both pressure heads are urged toward a neutral position, as illustrated in FIG. 3, by a biasing subassembly, one of which is shown at 60, including a spring 62 and a pin 64 slidably positioned in a slot 66.

A pressure equalizing plate 68 is pivotally mounted about a central axis 70 on a top and a bottom pivot pin 72,74 in a cavity 76 formed in the housing 48 and includes a first generally curvilinear convex face 78 for contacting the flat, exposed face 46 of the pressure plate 42 and a second, oppositely disposed generally curvilinear face 80. The second face is defined in part by a first and a second generally convex portion 82,84 each engaging the first and the second pressure heads 26,28 respectively.

A pair of reciprocating wedges 86,88 are positioned intermediate the exposed face of the pressure plate and the convex face of the pressure equalizing plate. Each wedge may be selectively moved inwardly or outwardly to either immobilize or lock the equalizing plate in a predetermined fixed position or to unlock the plate to permit pivotal movement thereof. The wedges are activated by a pair of shift arms 90,92 each pivotally connected at 94 and 96 respectively to the housing 48 and each arm having, respectively, one end 98,100 connected to a double-acting hydraulic cylinder 102 and a second ball-shaped end 104,106 inserted in a slot 108,110 in each wedge.

Industrial Applicability

With the parts assembled as set forth above, the present invention finds application wherever it is desirable to selectively apply pressure to spaced apart contact points in response to a differential between a resistance force at each contact point. One such application is the assembly of track chain for use on track-type vehicles.

In accordance with the teaching of the present invention, in the assembly of each side of a track chain, including pairs of spaced, side-by-side overlapping links secured to the ends of coacting, concentrically disposed pin and bushing subassemblies, a first pin 112 and bushing 114 are positioned on the first V-block 34, as shown in FIG. 2. A first link 116 having first and second ends 118 and 120 is located on the support plate 30, the link having a bushing bore 122 in alignment with the bushing and the first pressure head 26 of the multi-headed press fixture 22. With the pressure equalizing plate 68 located in an immobilized position by the wedges 86,88, the ram 20 is actuated with a preselected pressure. The first pressure head contacts the link at a first contact point 124 on the first end 118 and presses it onto the bushing forming a first joint 126.

Upon completion of the press, the ram 20 retracts to its initial position, and the indexing means (not shown) moves the pin 112, the bushing 114, and the link 116 a distance equal to the pitch of the chain being assembled to the second V-block 36 in alignment with the second pressure head 28. As shown in FIG. 3, a second coacting pin 128 and bushing 130 are placed on the first V-block 34, a thrust ring 132 is located on pin 112 and a second link 134, including first and second ends 136,138 and having a seal 140 preassembled therein is located on the nose adaptors 56,58 in a predetermined relationship with the first link and the first and second pins and bushings adjacent the multiheaded press fixture 22. The ram 20 is actuated at a preselected pressure with the pressure equalizing plate 68 locked by the wedges in an immobilized position. The first and second pressure heads 26,28 engage the second link at contact points 142,144 on the first and second ends respectively. The link, guided by the nose adaptors is simultaneously pressed onto the first pin at one end forming a first joint 146 and onto the second bushing at the other end forming a second joint 148 until either one or the other end is completely pressed onto its associated pin or bushing, a condition known in the art as "bottoming out." At this point a pressure relief valve (not shown) is actuated relieving the ram pressure and stopping the press. The hydraulic cylinder 102 is actuated and the shift arms 90,92 move the wedges 86,88 outwardly unlocking the pressure equalizing plate 68 permitting it to pivot about its central axis 70. The ram pressure is reapplied. The pressure equalizing plate, sensing the differential between the resistance force at the joint which is bottomed out and the resistance force at the other joint compensates therefore by pivoting about its axis and equally distributes the ram pressure by redirecting an increased pressure through the other reciprocating pressure head to the other joint, which results in both joints bottoming out. The ram is then retracted, the pressure equalizing plate is relocked by the wedges, and the process is repeated until a chain of the desired length is formed.

Thus, it can be seen that the chain is assembled in accordance with the present invention without introducing undesirable bending moments therein or damage to its components. Further, the assembled chain is free from high residual loads and has controlled minimum end play and correct bushing protrusion from each link.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

We claim:

1. An apparatus for selectively applying a pressure of a preselected level to first and second contact points (142,144) in response to a differential between a resistance force at each contact point (142,144) comprising:
    a housing (48) including first and second laterally spaced and individually movable pressure heads (26,28) for registry with the first and second contact points (142,144), respectively;
    means (42) for pressurizing the pressure heads (26,28); and
    means (68) for sensing the resistance force at each contact point (142,144), for compensating for the differential between the resistance forces at each contact point (142,144), and for directing an increased pressure to a preselected one of the contact points (142,144) in response to the differential between the resistance forces at the contact points (142,144).

2. The apparatus of claim 1 wherein the housing (48) included:
    first and second apertures (52,54), the apertures (52,54) respectively having the first and second pressure heads (26,28) reciprocally mounted therein.

3. The apparatus of claim 2 wherein each of the pressure heads (26,28) includes a nose adapter (56,58) disposed for registration with a respective one of the first and second contact points (142,144).

4. The apparatus of claim 1 wherein the pressurizing means (42) is a pressure plate (42).

5. The apparatus of claim 1 wherein the sensing, compensating, and pressure directing means (68) is a plate (68) pivotally mounted between the pressurizing means (42) and the first and second pressure heads (26,28) including a first generally curvilinear convex face (78) having a portion thereof adapted for engagement with pressurizing means (42) and a second, oppositely disposed generally curvilinear face (80) defined in part by first and second generally convex portions (82,84) each convex portion (82,84) having a portion thereof engaging the first and the second pressure heads (26,28) respectively.

6. The apparatus of claim 1 including means (86,88) for immobilizing the sensing, compensating, and pressure directing means (68).

7. The apparatus of claim 6 wherein the immobilizing means (86,88) is in the form of wedge means (86,88) reciprocally mounted between the pressurizing means (42) and the sensing, compensating and pressure directing means (68).

8. The apparatus of claim 6 further including means (90,92,102) for actuating the immobilizing means (86,88) to selectively lock or unlock the sensing, compensating, and pressure directing means (68).

9. The apparatus of claim 8 wherein the actuating means (90,92,102) includes a hydraulic cylinder (102).

10. An apparatus for selectively applying a pressure of a preselected level to first and second contact points (142,144) in response to a differential between a resistance force at each contact point (142,144) comprising:
    a housing (48) including first and second pressure heads (26,28) for registry with the first and second contact points (142,144), respectively;
    means (42) for pressurizing the pressure heads (26,28);
    means (68) for sensing the resistance force at each contact point (142,144), for compensating for the differential between the resistance forces at each contact point (142,144), and for directing an increased pressure to a preselected one of the contact points (142,144) in response to the differential between the resistance forces at the contact points (142,144); and
    means (86,88) for immobilizing the sensing, compensating, and pressure directing means (68).

11. An apparatus for selectively applying a pressure of a preselected level to first and second contact points (142,144) in response to a differential between a resistance force at each contact point (142,144) comprising:
    a housing (48) including first and second pressure heads (26,28) for registry with the first and second contact points (142,144), respectively;
    means (42) for pressurizing the pressure heads (26,28); and
    means (68) for sensing the resistance force at each contact point (142,144), for compensating for the differential between the resistance forces at each contact point (142,144), and for directing an increased pressure to a preselected one of the contact points (142,144) in response to the differential between the resistance forces at the contact points (142,144), including a plate (68) pivotally mounted between the pressure heads (26,28) and the pressurizing means (42).

* * * * *